US012577968B2

(12) United States Patent (10) Patent No.: US 12,577,968 B2

Do et al. (45) Date of Patent: Mar. 17, 2026

(54) SOFT VARIABLE IMPEDANCE ACTUATOR USING EMBEDDED JAMMING LAYER

(71) Applicant: The Board of Trustees of the Leland Stanford Junior University, Stanford, CA (US)

(72) Inventors: Brian H. Do, Plant City, FL (US); Inrak Choi, Seoul (KR); Sean Weston Follmer, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 18/379,856

(22) Filed: Oct. 13, 2023

(65) Prior Publication Data

US 2024/0035494 A1 Feb. 1, 2024

Related U.S. Application Data

(63) Continuation-in-part of application No. 18/109,432, filed on Feb. 14, 2023, now abandoned.

(60) Provisional application No. 63/310,642, filed on Feb. 16, 2022.

(51) Int. Cl.
*F15B 15/10* (2006.01)
*B25J 9/14* (2006.01)
*B25J 19/00* (2006.01)

(52) U.S. Cl.
CPC ............. *F15B 15/103* (2013.01); *B25J 9/142* (2013.01); *B25J 19/0004* (2013.01)

(58) Field of Classification Search
CPC .... B25J 9/142; B25J 19/068; F15B 2211/715; F15B 15/103
See application file for complete search history.

(56) References Cited

PUBLICATIONS

Choi et al., A Soft Controllable High Force Density Linear Brake Utilizing Layer Jamming, IEEE Robotics and Automation Letters, vol. 3, No. 1 , Jan. 2018 (2018) p. 450-457.*
Jitosho et al., A Reference Augmentation Design for the Adaptice Control of a Wearable Assist Robot Powered by the Mckibben Actuator, IEEE International Conferance on Systems, Man, and Cybernetics, 2017, Oct. 5-8, 2017 p. 1099-1104.*
Choi et al. A Soft, Controllable, High Force Density Linear Brake Utilizing Layer Jamming. IEEE Robotics and Automation Letters. 2018, pp. 450-457.

* cited by examiner

*Primary Examiner* — Nathaniel E Wiehe
*Assistant Examiner* — Daniel S Collins

(57) ABSTRACT

A variable impedance actuator is provided with a bladder-style actuator having a first end and a second end, and a jamming brake located inside the bladder-style actuator and connected to the first end and the second end of the bladder-style actuator. The bladder-style actuator and the jamming brake are independently controlled.

2 Claims, 10 Drawing Sheets

22.5 cm 2.5 cm

Nylon mesh

Silicone bladder

Screws (×4)

Hose clamps (×2)

Zip ties

Brake silicone membrane

Hose fittings (×2)

Layers (×21)

Layers (×21)

SJBAM cross section

SOFT VARIABLE IMPEDANCE ACTUATOR USING EMBEDDED JAMMING LAYER

CROSS-REFERENCE TO RELATED APPLICATIONS

This application is a continuation-in-part of U.S. patent application Ser. No. 18/109,432 filed Feb. 14, 2023, which is incorporated herein by reference. U.S. patent application Ser. No. 18/109,432 claims priority from U.S. Provisional Patent Application 63/310,642 filed Feb. 16, 2022, which is incorporated herein by reference.

STATEMENT OF GOVERNMENT SPONSORED SUPPORT

This invention was made with Government support under contract 1542152 awarded by the National Science Foundation. The Government has certain rights in the invention.

FIELD OF THE INVENTION

This invention relates to actuators with an embedded jamming layer.

BACKGROUND OF THE INVENTION

Variable impedance actuators (VIAs) have the potential to enable more robust, dexterous, and safe interactions between robots and the outside world. When comparing current robotic actuators to their biological counterparts, one key distinguishing feature of muscle is its ability to vary both stiffness and damping. Biological muscle is versatile, and can behave like a brake, a strut, and a spring in addition to a motor. Animals vary their muscle impedance depending on the application. For example, legged animals use variable damping to stabilize their walking gait and vary their leg stiffness during running.

Although traditional robotic actuators can be programmed to alter their interaction impedances, varying impedance mechanically allows robots to achieve adaptive behavior without the same stability and bandwidth limitations inherent to active control—enabling physically embodied intelligence.

One subclass of VIAs are variable stiffness actuators (VSAs). While variable stiffness can improve intrinsic safety, it can also introduce new challenges, such as underdamped dynamics, and may result in instability. Inherent joint compliance from VSAs can also make unexpected collisions more dangerous in a pre-tensioned state or at high velocities due to their energy storage.

Another subclass of VIAs are variable damping actuators (VDAs). VDAs enable new capabilities such as energy dissipation and address limitations of compliance alone, such as improving position accuracy by minimizing structural resonances. Despite this, they have received comparatively less attention to VSAs.

Beyond variable impedance, muscle also has high power-to-weight ratio and is soft. Compliance can be built into robotic actuators in several ways, such as by incorporating springs or by using soft materials. Actuators made out of inherently compliant and flexible materials with properties analogous to biological muscle, such as pneumatic artificial muscles (PAMs), can enable the creation of entirely soft robots.

While there has been significant interest in VIAs as well as in soft actuators, there has not been an all-soft VIA with both controllable variable stiffness and damping. Such all-soft VIAs could enhance the embodied intelligence of soft robots, enabling wider forms of interactions. Traditional robots could also benefit from all-soft VIAs by incorporating these actuators alongside traditional motors in a macro-mini actuation approach. The present invention addresses these shortcomings in the art and provides a new type of actuator.

SUMMARY OF THE INVENTION

Biological muscle is a multi-functional actuator capable of varying its stiffness and damping. The design of similarly multipurpose variable impedance actuators has benefits for improving physical robot interaction. This invention presents the concept for a soft jamming brake and artificial muscle (SJBAM). By incorporating a jamming brake inside of a pneumatic artificial muscle, the inventors achieved synergistic benefits which improve muscle static and dynamic response and expand the brake bandwidth while also enabling new functionality. The SJBAM can store elastic energy like a PAM and also act as a brake or clutch. By independently controlling the muscle and brake pressures, one can vary the SJBAM's stiffness and damping.

In one embodiment, the invention is a variable impedance actuator with independent control of stiffness and damping of the actuator. The actuator has a McKibben actuator having a first end and a second end, and a jamming brake located inside the McKibben actuator and connected to the same first end and the same second end of the McKibben actuator. The McKibben actuator and the jamming brake are independently controlled.

In another embodiment, the invention is a variable impedance actuator with independent control of stiffness and damping of the actuator. The actuator has a bladder-style actuator having a first end and a second end, and a jamming brake located inside the bladder-style actuator and connected to the first end and the second end of the bladder-style actuator. The bladder-style actuator and the jamming brake are independently controlled.

For all embodiments, the jamming brake has n layers of stacked material split into two sets of layers, where there is a length L1 which is the length protruding from the first end, where there is a length L2 which is the length protruding from the second end, and where there is an overlapping length Loverlap which is the length corresponding to the overlapping region between the two sets of layers.

The SJBAM can be used in all applications where McKibben muscles and other similar pneumatic actuators are currently in use, such as for industrial robots or other industrial machinery, exoskeletons or haptic interfaces.

The SJBAM enables positive pressure layer jamming and thus does not need a vacuum to jam. It also increases the bandwidth of jamming devices due to its ability to achieve super-atmospheric pressure differences.

BRIEF DESCRIPTION OF THE DRAWINGS

(FIG. 1C) SJBAM exploded view. The outer McKibben muscle is composed of a nylon mesh surrounding a silicone elastomeric bladder secured to end caps using hose clamps. Inside is a layer jamming brake consisting of a silicone membrane and two sets of 42 interdigitated PTFE layers, each mounted to an end cap using 2 screws. Zip ties secure the membrane to the end caps. Air is delivered independently to the muscle and brake via hose fittings.

(FIG. 2A) The SJBAM has a brake (201) inside of a PAM (202). The pressures $P_i$ and $P_o$ in the brake and the muscle, respectively, can be controlled independently. As the muscle contracts, the cross-sectional area of the brake defined as h by w remains the same. (FIG. 2B) A schematic of the SJBAM, showing a jammed state with an external lateral force, $F_{tensile}$. This tensile force is opposed by the brake elastic membrane tension $f_e$ and inter-layer friction $f_f$ resulting from the normal force produced by the pressure differential $\Delta P$ caused by the difference in the muscle pressure $P_o$ and the brake pressure $P_i$. The minimum SJBAM length $L_{min}$ corresponds to the maximum amount of overlap between the layers Loverlap. (FIG. 2C) The SJBAM can be pulled to a maximum length $L_{max}$ defined by the resting length of the muscle.

(FIG. 10A) The SJBAM can either store or dissipate energy following acceleration of the manipulator. (FIG. 10B) In brake mode, the jammed brake dissipates energy through friction. (FIG. 10C) In muscle mode, the SJBAM functions like a McKibben muscle and can store energy for rebound. (FIG. 10D) In hybrid mode, both the brake and muscle are active.

DETAILED DESCRIPTION

Figures 1A, 1B, 1C:
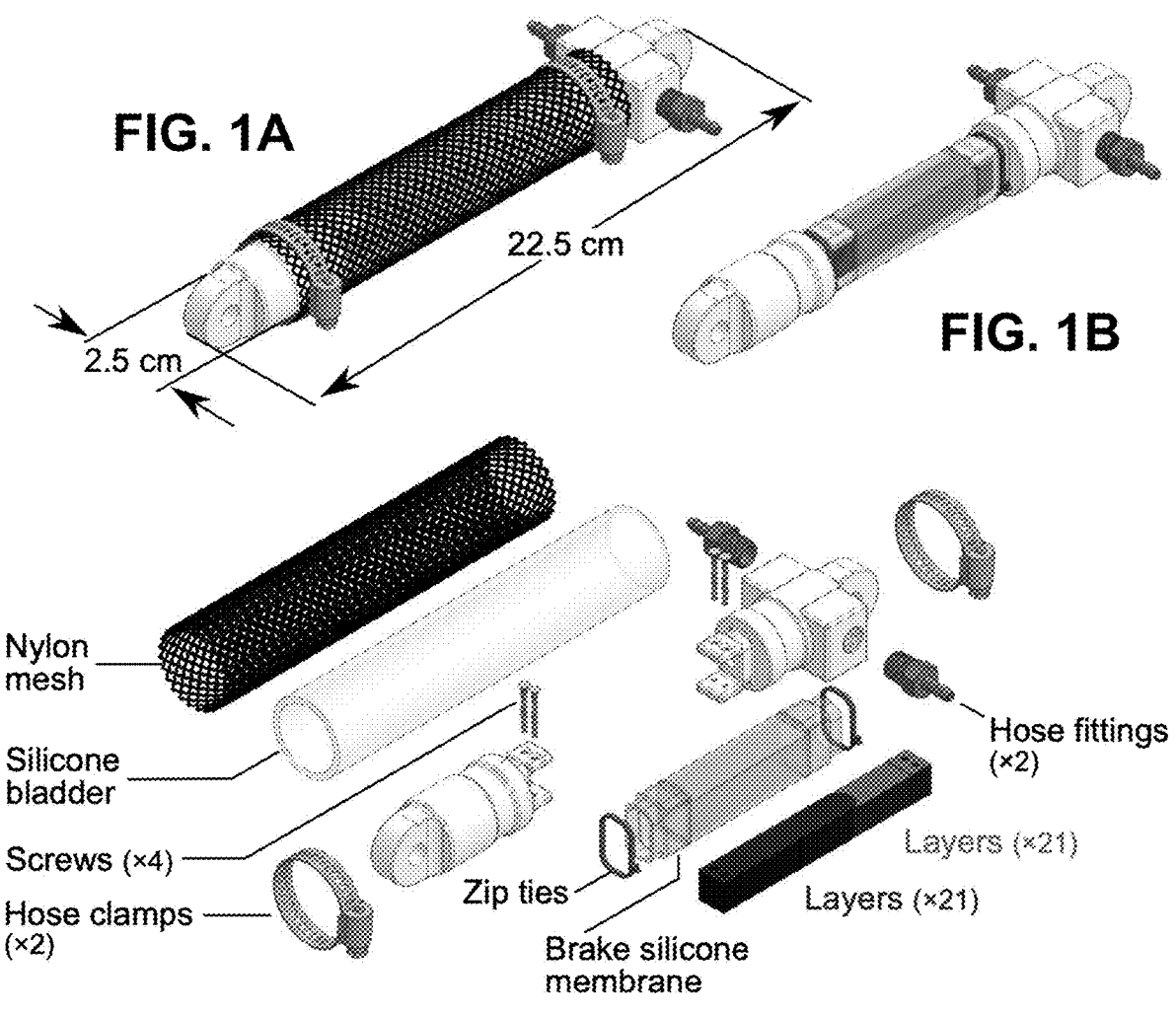
FIGS. 1A-C show according to an exemplary embodiment of the invention a schematic of an SJBAM and its constituent components (FIG. 1A) The SJBAM consists of an outer McKibben muscle and (FIG. 1B) an inner layer jamming brake.
Figures 2A, 2B, 2C:
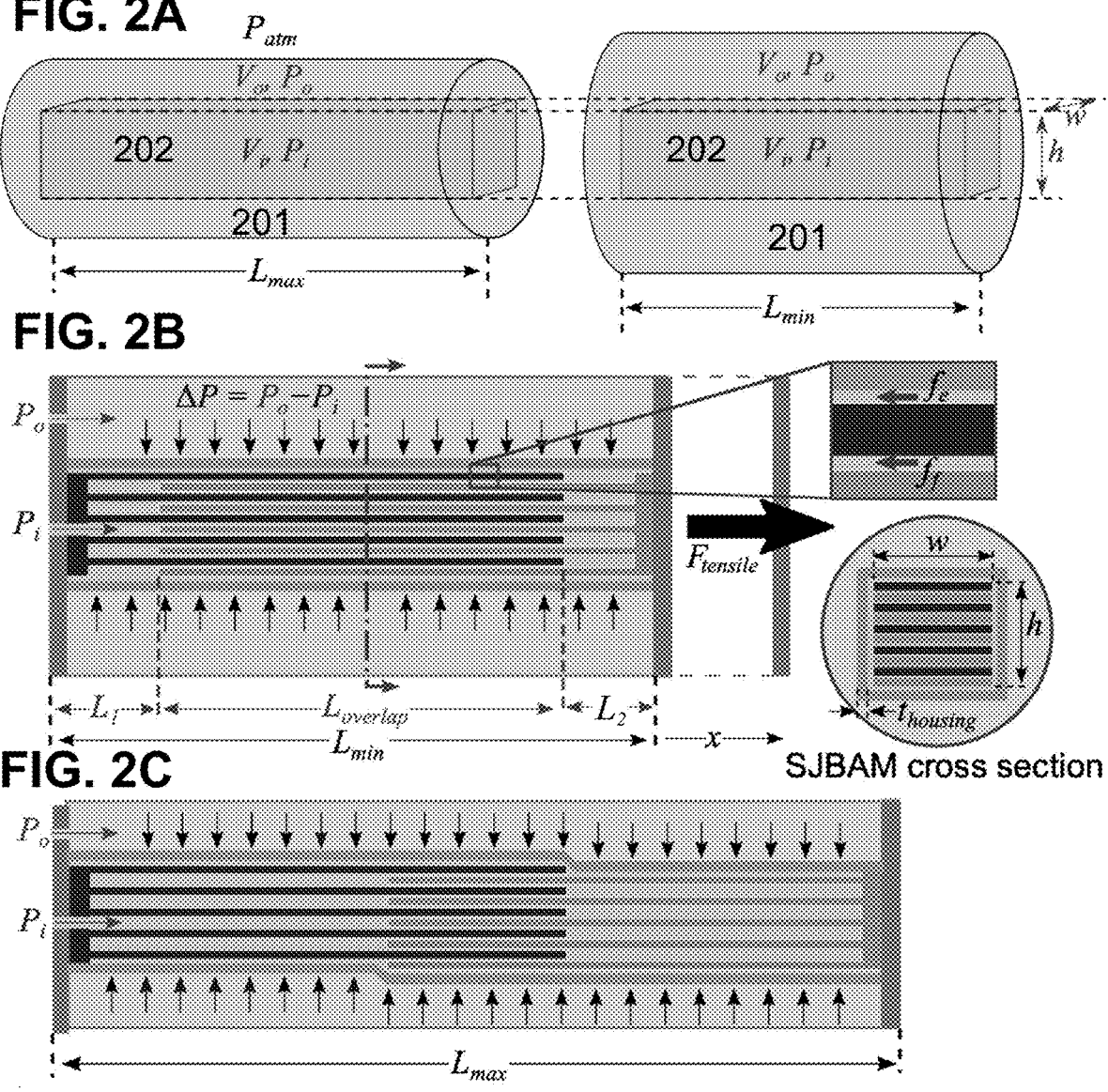
FIGS. 2A-C show according to an exemplary embodiment of the invention a SJBAM quasi-static model.
Figure 3:
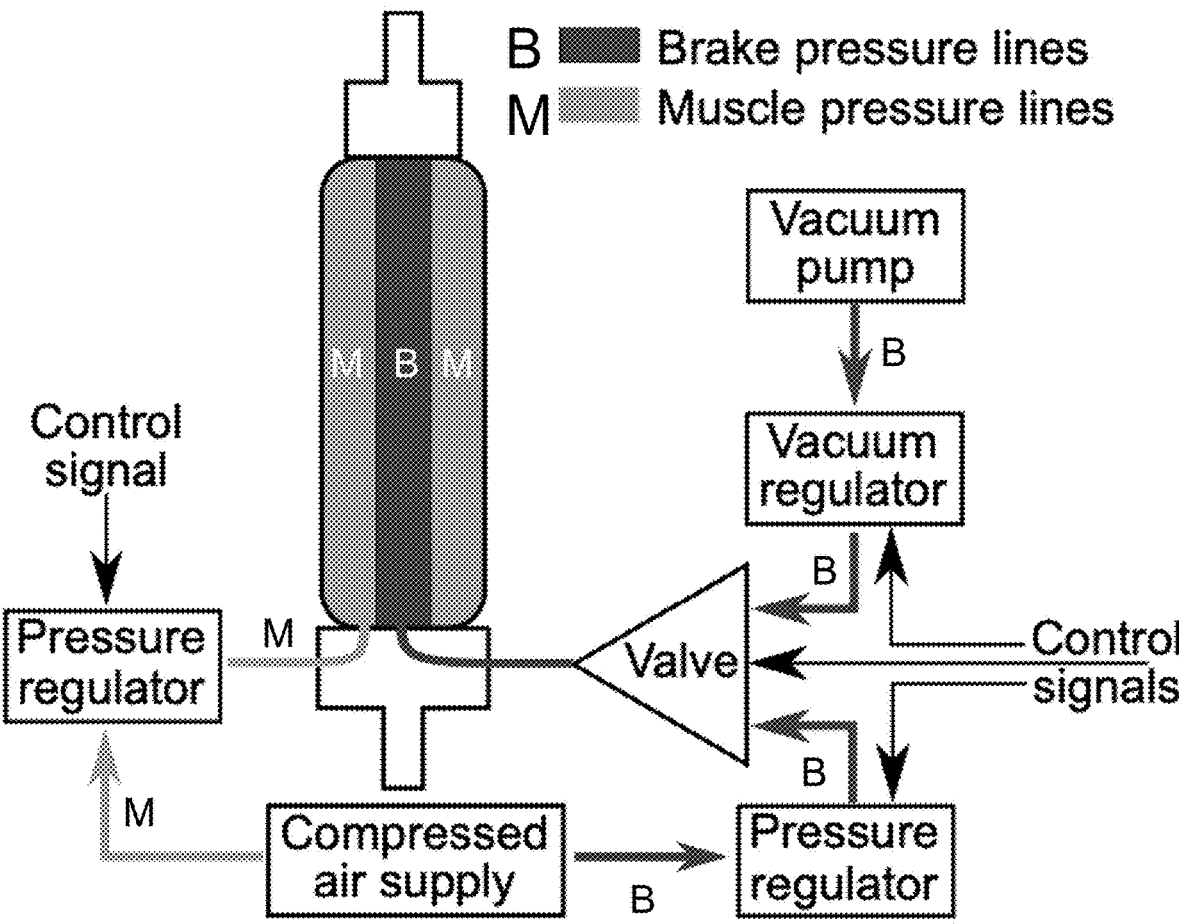
FIG. 3 shows according to an exemplary embodiment of the invention a system architecture to control an SJBAM.
Figure 4:
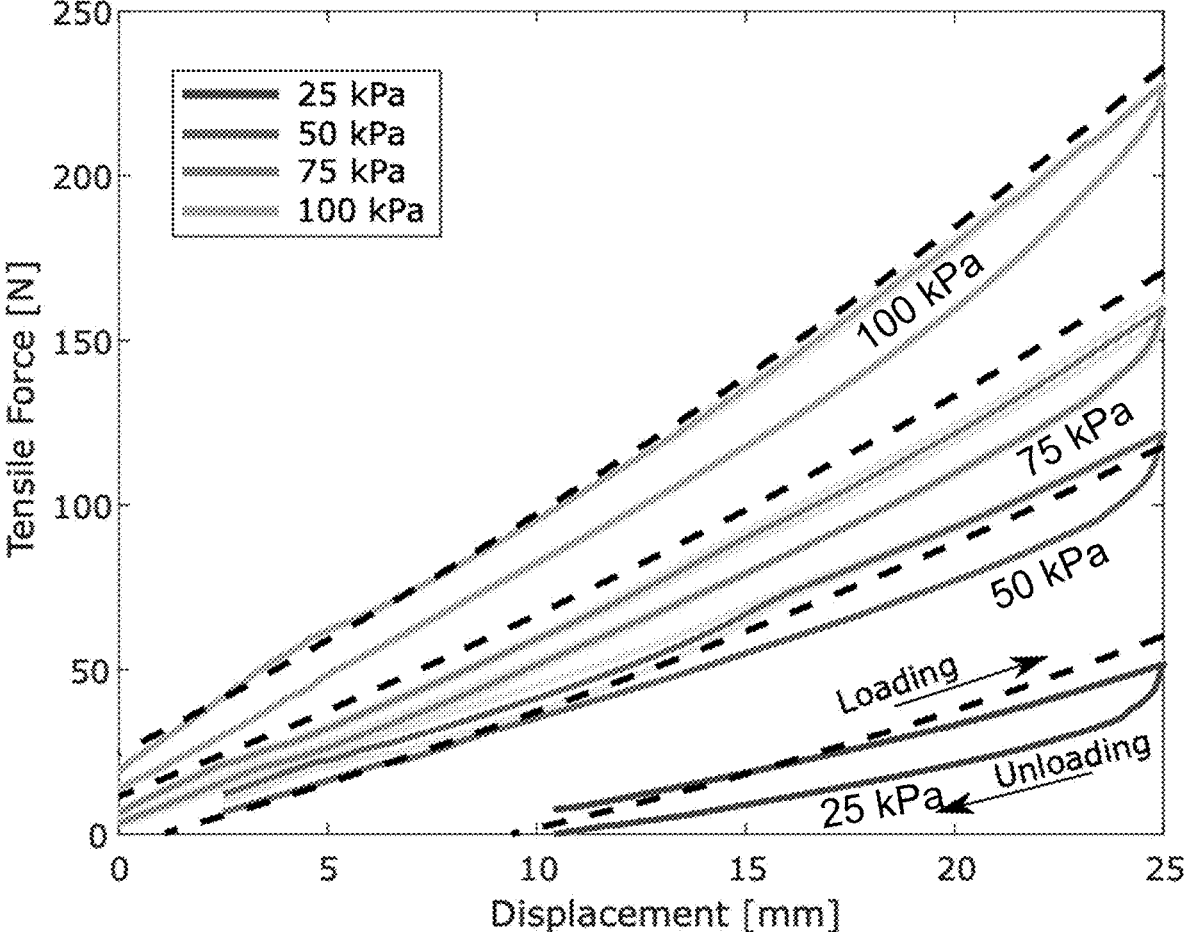
FIG. 4 shows according to an exemplary embodiment of the invention force-displacement curves of the SJBAM as a muscle from cyclic loading at 25, 50, 75, and 100 kPa. Dashed lines correspond to model predictions. Light gray lines show one standard deviation error respectively.
Figure 5:
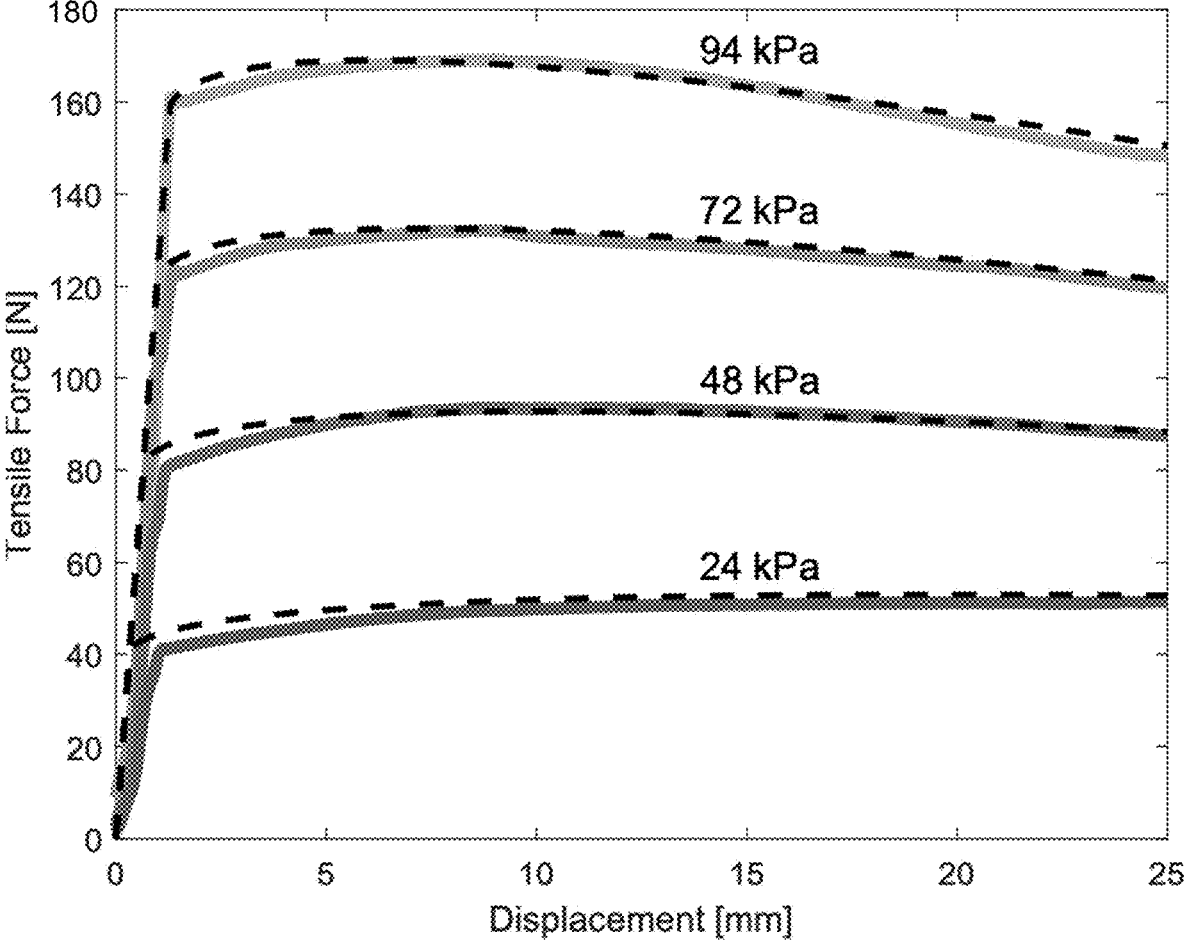
FIG. 5 shows according to an exemplary embodiment of the invention force-displacement curves of the SJBAM as a brake from tensile tests at four different $\Delta P$, each listed above their corresponding loading curve. Dashed lines correspond to model predictions.

The inventors provide herein a low-cost, all-soft VIA composed of a soft jamming brake and artificial muscle (SJBAM) (FIGS. 1A-C). The SJBAM incorporates a soft layer jamming brake (SLJB) inside of a PAM. The SJBAM's mechanical design enables independent control of its stiffness and damping. The SJBAM can act as a store of elastic energy like a PAM or dissipate energy and serve as a brake. One could also vary the SJBAM's damping and inertial properties, enabling it to act as a clutch or strut. The combination of a SUB and a PAM also yields three main synergistic benefits: 1) super-atmospheric layer jamming without the need for negative pressure, 2) increased muscle force production, and 3) improved response time. Overall, the SJBAM address several limitations of PAMs while retaining low inertia, high force density, and inherent compliance.

Variable Stiffness Actuators and Soft Actuators

VSAs are a major focus of the robotics community. A multitude of designs have been proposed and can be broadly divided into those that vary spring preload, transmission between load and spring, and the spring's physical properties. The focus on VSAs has been driven by the desire for safer and more robust actuators. These have also motivated the parallel development of soft robots made of low stiffness materials.

A core challenge in soft robotics today is controlled variable stiffness. However, unlike traditional actuators which must add compliance, soft actuators—which are inherently compliant—must add stiffness. Fundamental questions remain about simultaneously achieving variable stiffness, integrating into entirely soft robot bodies, and optimizing interactions with the environment. Variable stiffness could enable soft robots to better reject disturbances and improve their precision.

The most widely used soft actuator is the PAM. PAMs passively behave as nonlinear springs and can be used to provide variable joint stiffness when used in an antagonistic architecture. PAMs have a number of attractive properties, including intrinsic compliance, low weight, easy fabrication, and high force density. The most widely used PAM is the McKibben muscle, which is composed of an elastomer bladder inside of a flexible, inextensible fiber mesh which con-verts radial expansion when pressurized into axial motion.

Using PAMs as VSAs introduces tradeoffs such as the inability to produce a high stiffness system with little yielding around its equilibrium point or vary the shape of the stiffness curve. Furthermore, maintaining an equilibrium position requires a preload, which may generate large forces on the surrounding structure.

Work to enable stiffness control of PAMs includes parallel arrangements of extensor and contractor muscles, which further complicates position control due to interaction forces between the muscles; pneumatic-hydraulic actuation, which requires a vertical muscle orientation to prevent mixing of hydraulic fluid with pneumatics; and embedded tendons, which require motors to control the tendon tension.

Variable Damping Actuators

Biological muscle has variable damping. Organisms can alter the damping of their joints, and the effective damping of entire body segments can also be modified to produce stable locomotion patterns. Without varying damping, actuators are limited in their ability to match the performance and versatility of biological muscle.

Despite comparatively less focus on variable damping than variable stiffness, energy-dissipative elements such as brakes or dampers can improve robot safety and broaden impedance. They are classified as passive, semi-active, or active, depending on the energy required to operate them.

Passive dampers have fixed damping, which may lower potential performance due to energy loss. A passive hydraulic damper in parallel with a McKibben muscle has been used to absorb excess energy after collisions. Semi-active damping enables a range of achievable damping while retaining stability guarantees due to removal of energy from a system. A variable physical damping actuator has been proposed using a friction disk damper actuated by stacked piezo-electric actuators. Finally, active damping involves an active force element which can overcome the passive system dynamics, which can destabilize the system.

Several approaches combining a PAM and a brake for hybrid actuation have been investigated, including using an MR brake, an ER damper, and a motor with a magnetic particle brake. These approaches are limited by their low force density, introduction of rigid components into otherwise soft actuators, increase in system size, and need to expend energy to maintain braking force.

Jamming

Jamming represents an intersection between variable stiffness and damping structures. It involves the generation of a pressure gradient to compact layers or particles together. Work on jamming has focused on using a negative pressure source to produce a binary transition between soft and rigid states, allowing structures to alternate between retaining their shapes and compliantly interacting with their environment. Within the context of actuators, jamming has mainly been used to increase bending stiffness. More recently, layer jamming has been used to precisely modify the overall mechanical characteristics of structures through both controllable stiffness as well as through damping. When a laminar structure is initially jammed, its layers are cohesive. When forces above a certain threshold are applied, the layers slide, resulting in energy dissipation via friction.

The inventors have leveraged this to produce the SUB. The SUB relies on a negative pressure difference to compress layers together. This compression produces increased normal force on the layers and consequently, increased friction between them, resulting in a larger force required to pull the layers apart which can be tuned via the pressure difference.

Materials and Methods

Concept Overview

The SJBAM has a layer jamming brake embedded inside of a PAM. The resulting synergistic benefits improve performance compared to a PAM in shock absorption, stiffness variation with constant load, and stiffness variation at constant position, which are among the most common VIA use cases.

Overall, the SLJB tunes the SJBAM's linear stiffness and damping. The brake functions as a semi-active Coulomb friction damper, with energy dissipation tuned via the pressure difference across the brake. This reduces oscillation of the inherently underdamped PAM, and unlike a viscous damper, the SLJB can produce high damping at low velocities and can clamp a mass in place. No energy is required to maintain the braking state once the pressure difference has been set. Jamming produces an orders-of-magnitude increase in the SJBAM stiffness by varying the SLJB's moment of inertia. The SLJB can be "mechanically programmed" to passively yield at a given force, allowing for energy dissipation above a threshold. Additionally, the SJBAM can reset an extended SLJB via unjamming the brake and contracting the PAM. Finally, the incorporation of a brake inside of a PAM does not increase the overall device profile, and the softness of both the brake and muscle in the SBJAM's passive state enables the SJBAM to be used in applications in which softness is advantageous, such as in soft robots engaging in human-robot interaction.

There are several benefits for the SLJB. Traditional jamming devices have a bandwidth limited to 1 atm and require the use of a vacuum source. Incorporating a jamming brake inside of a PAM enables positive pressure jamming and addresses these issues due to the PAM operating at pressures >1 atm. Thus, the SJBAM can generate a negative pressure gradient across the brake without a vacuum, and brake bandwidth can be a super-atmospheric range.

For the PAM, there are also several benefits. Because the brake occupies a central volume, the PAM interior volume is reduced, reducing inflation and deflation times and improving dynamic response. This reduced volume also allows for slightly higher muscle force output over the entire range of motion and increases the energy efficiency.

One key consideration is the choice of soft actuator to use with the brake. The maximum SLJB strain is 100%, with higher strains resulting in the two sets of layers no longer being interdigitated. Thus, in the SJBAM, 1) the brake's travel should match the actuator's displacement and 2) the brake's minimum length should match the actuator's minimum length. The maximum brake displacement is constrained by the maximum actuator length. In theory, any fluidic actuator with a maximum strain <100% can be used.

Design and Fabrication

The SJBAM has been implemented using a pneumatic McKibben muscle due to its widespread use throughout the robotics community to enable direct comparison of the SJBAM performance against that of the McKibben muscle.

The inner layer jamming brake and outer fluidic muscle of the SJBAM are both mounted to the same set of end caps. The jamming brake unit has n layers of stacked material split into two sets of layers, each attached to an endcap. There is a length L1 which is the length protruding from the left endcap that does overlap with the layers from the right; a length Loverlap which is the length corresponding to the overlapping region between the two sets of layers; and L2 which is the length from the right endcap that does overlap with the layers from the left.

The assembly of the SJBAM is as follows: connect the brake layers to the two end caps and fasten each set down with corresponding screws. Afterwards, slide the brake cover onto one end cap and interleave the layers together, sliding the brake cover onto the opposite end cap once the layers are interdigitated. Secure the ends of the brake cover to the end caps with zip-ties. Then, slide on the muscle elastomeric bladder and braided mesh, securing them with hose clamps. Finally, screw hose fittings into the appropriate end cap.

FIGS. 1A-C shows diagrams of an SJBAM. In an exemplary embodiment, the inner SUB has 42 PTFE layers, a flexible silicone outer cover, 4 screws, and 2 end caps. The 42 layers are divided so that 21 layers are fixed to each end cap, with the layers laid in an interdigitated pattern. Each PTFE layer is 0.254 mm thick, 64.7 mm long, and 11.43 mm wide. PTFE was chosen as the layer material due to its relatively low stick-slip motion. The layers were cut using a $CO_2$ laser cutter.

The flexible outer cover of the SUB is made from Ecoflex 5 platinum catalyzed silicone. This silicone cover was created by injection molding using a dispenser which mixed the two-part silicone cure into a mold created using an Objet24 3D printer. The cover has a wall thickness of 1 mm.

The inclusion of a layer jamming brake results in a total weight of 169 g SJBAM compared to 136 g for a standalone McKibben muscle.

The McKibben muscle has a polyester sleeve and a silicone bladder, which was also made by injection molding in a 3D printed mold. The bladder is made from Dragon Skin 10 Medium with a wall thickness of 2.5 mm, inner diameter of 25.4 mm, and length of 150 mm.

The end caps were 3D-printed using a 3D printer and were designed for mounting on an Instron machine. One end cap has two air channels to direct air flow from an exterior air supply to either the brake or muscle compartments. Thus, SLJB and McKibben muscle pressures can be controlled independently. Tubing is secured to the end cap via hose fittings. A pressure difference across the SLJB, and thus jamming, can be induced by setting the SLJB to a lower pressure than the surrounding McKibben muscle. Likewise, the SLJB can be unjammed by setting the SLJB to the same pressure as the surrounding McKibben muscle.

Modeling

The SJBAM has three operating modes: 1) a VIA, 2) an enhanced bandwidth layer jamming brake, and 3) a McKibben muscle. The quasi-static models for each mode and derive a model for the stiffness of an SJBAM are described in Appendix A, Section IV Modeling, in U.S. Provisional Patent Application 63/310,642 filed Feb. 16, 2022 to which this application claims the benefit.

SJBAM Combined Muscle and Brake

When engaging the brake and muscle in the SJBAM simultaneously, one could either 1) maintain constant pressure in both the brake and the muscle or 2) vary the pressure, allowing for actively-tuned force-displacement curves during loading or unloading. Both conditions were tested.

Constant Pressure

Figure 6:
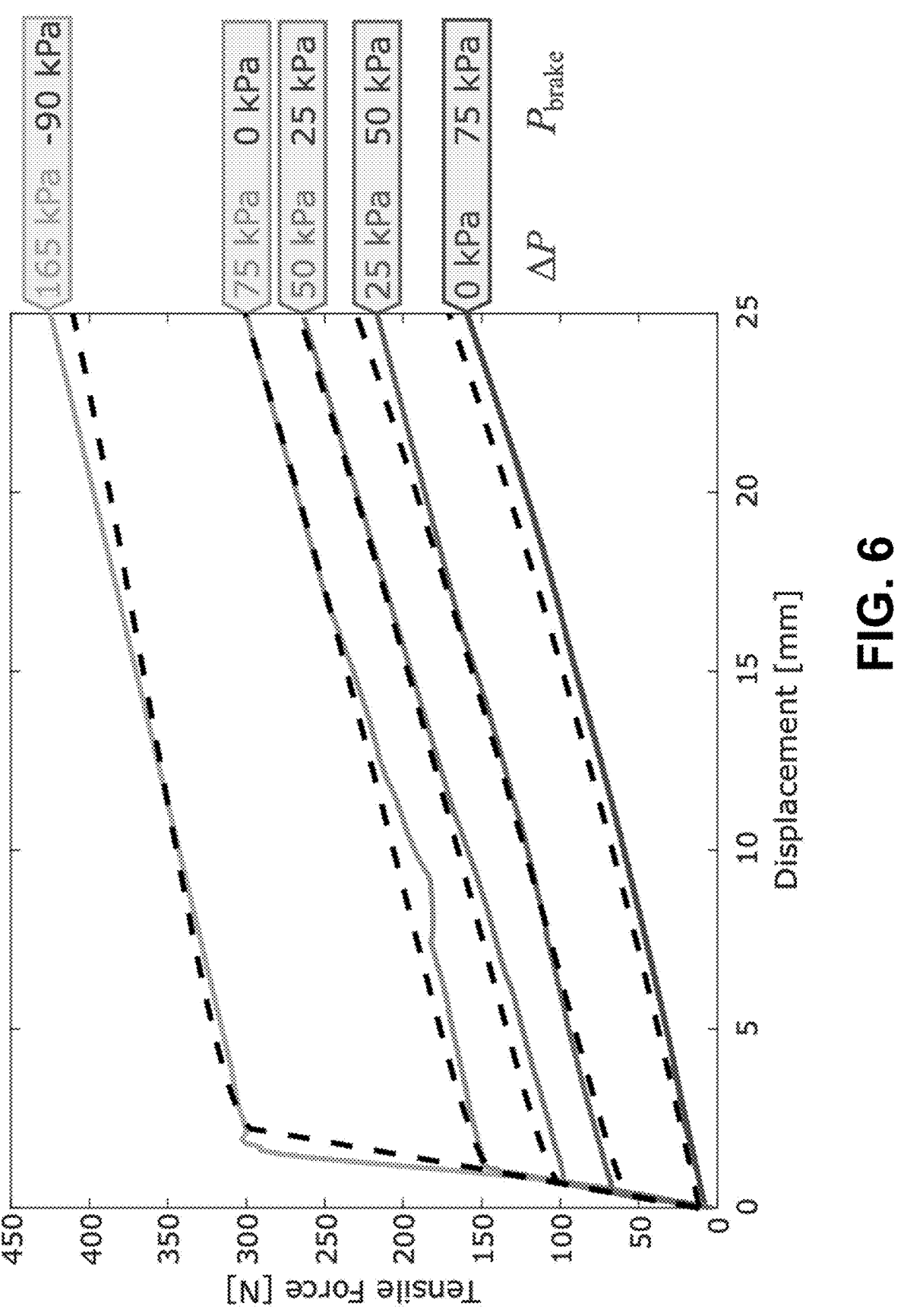
FIG. 6 shows according to an exemplary embodiment of the invention force-displacement curves of SJBAM with the muscle and brake active simultaneously. The muscle was set to 75 kPa and brake pressure was varied to produce desired $\Delta P$. Dashed lines correspond to model predictions.

FIG. 6 shows the mean force-displacement curves and the simulated curves for an SJBAM with the muscle pressure Po=75 kPa and the brake pressure set at various pressures. FIG. 6 lists the pressure difference $\Delta P = Po - Pi$ producing each force-displacement curve as well as the corresponding absolute Pbrake.

Here, one could see two novel properties of the SJBAM: 1) its use of positive-pressure layer jamming and 2) its super-atmospheric pressure range. Despite operating the brake above atmospheric pressure, because the McKibben muscle is at an even higher pressure, jamming still occurs. Therefore, even without a vacuum source, the brake of the SJBAM can still be used through this "positive-pressure" layer jamming. Furthermore, the properties of the brake can be actively controlled since we are able to directly control Pbrake.

Because the brake operates inside of the higher-pressure McKibben muscle, super-atmospheric pressure ranges are achievable unlike with other jamming devices which are confined to a 1 atm pressure range due to operating in the atmosphere. The use of a vacuum produces additional brake force and allows for brake operation even at low McKibben pressures. In this case, a super-atmospheric $\Delta P = 165$ kPa was achieved, resulting in over 125 N of additional braking force as compared to the $\Delta P = 100$ kPa case.

Tuned Force-Displacement Curves

The SJBAM muscle and brake pressures can be actively controlled to produce desired force-displacement curves.

For the test set-up for these actively tuned force-displacement tests, one endcap of an SJBAM was mounted to a Mark-10 force gauge (CSC Force Measurement) while the other end cap was mounted to a moving platform on a linear track, allowing for one degree of freedom movement. The displacement of the SJBAM relative to its maximally-pressurized length was measured using a linear magnetic encoder (RLS LM15). Loads were applied to the SJBAM using hanging weights connected via a pulley. For these tests, open-loop force control using (15) was performed using displacement measurements from the linear encoder.

For a given muscle pressure, the minimum force that can be produced by the SJBAM is the force produced by the SJBAM in its muscle mode. The maximum force that can be produced is the sum of the forces produced by the muscle and the brake where $\Delta P$ is maximal given the pressure sources. Any arbitrary force-displacement curve within the region bounded by these two limits is achievable.

Figure 7:
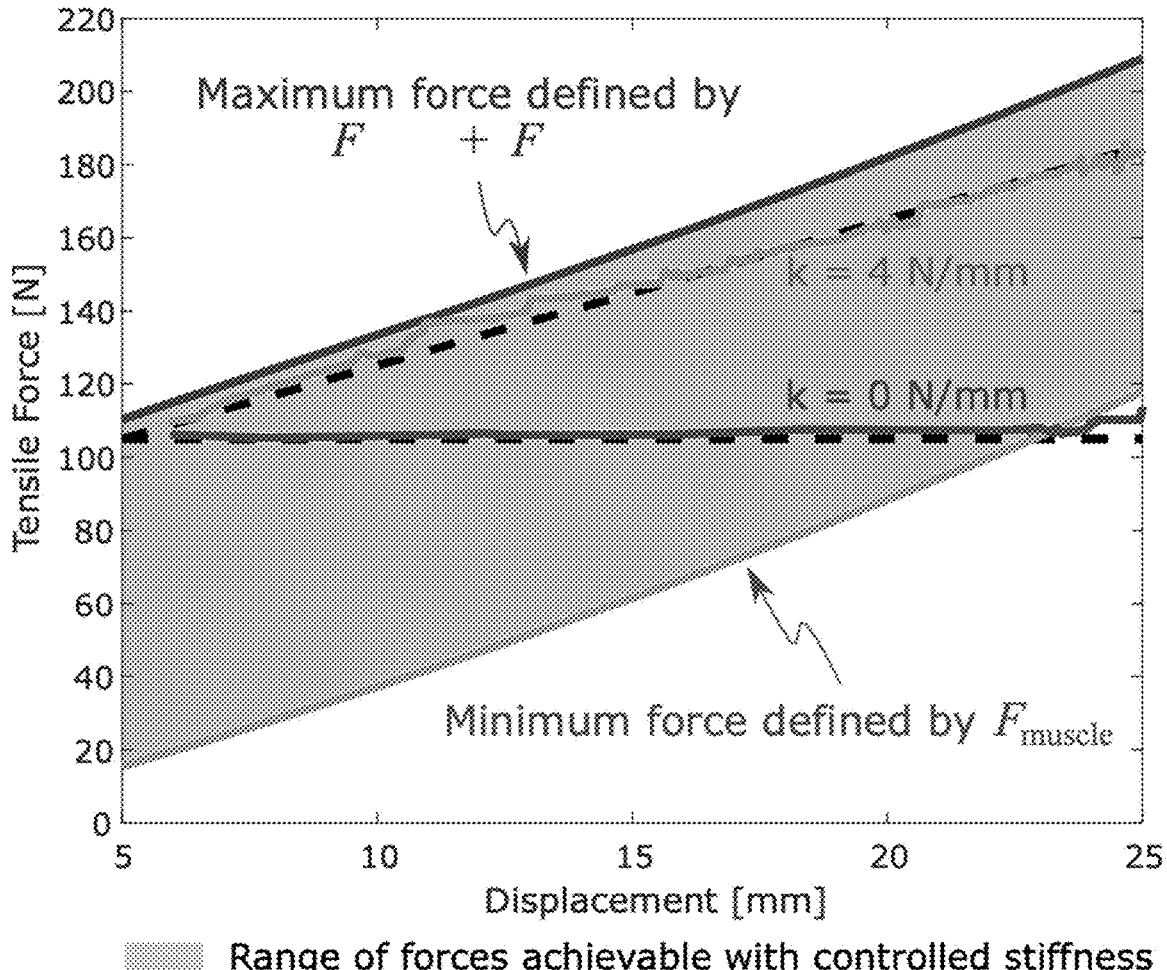
FIG. 7 shows according to an exemplary embodiment of the invention of how the SJBAM force displacement relationship can be tuned through controlling the brake force to yield different effective stiffnesses.

FIG. 7 shows two actively-tuned force displacement curves—one for a stiffness of 0 N/mm and another for 4 N/mm—for an initial force offset of 105 N and a muscle pressure of 75 kPa. In the experiment, the inventors used the atmosphere as our negative pressure source. If the minimum pressure was lower, such as vacuum, the maximum force would increase compared to that shown in FIG. 7, as FIG. 6 indicates.

Dynamic Results

Step Response

A limitation of McKibben muscles in dynamic applications is their relatively slow rise, fall, and delay times due to the nature of gas pressure transmission. Much of this stems from the time required to transfer the working fluid to/from the McKibben muscle volume.

By incorporating a brake into a PAM, the SJBAM reduces the volume needed to be pressurized. To examine the effects of this on the SJBAM's dynamic properties, the responses of an SJBAM and a standalone McKibben muscle to a step pressure increase and decrease of 100 kPa were recorded. 10-90% rise and fall times was shown for the pressure inside each device as well as their 50% delay-times. Across each of these parameters, the SJBAM as a muscle has improved dynamic response compared to the standalone McKibben muscle.

The brake dynamic response of the SJBAM shows further improved dynamic response with lower rise, fall, and delay times due to its smaller volume. This faster response time could allow the brake to quickly compensate for position errors in the muscle. It also allows the brake to be used as a clutch, rapidly disengaging to allow for faster movement and then re-engaging to stop further muscle movement.

Damping

To investigate the stiffness change and damping capability of the SJBAM compared to a traditional McKibben muscle, the inventors conducted experiments in which one end of the actuator was clamped and the other end suspended. An accelerometer was secured to the free end. A 2.5 kg mass was attached via a nylon rope to the free end of the actuator. The mass was then lifted 5 mm above its equilibrium rest position and dropped. The resulting acceleration profile was recorded for three test conditions: a standalone McKibben muscle, an SJBAM with its brake set at 0 kPa for a $\Delta P = 75$ kPa, and an SJBAM with its brake set at maximum vacuum pressure.

Figure 8:
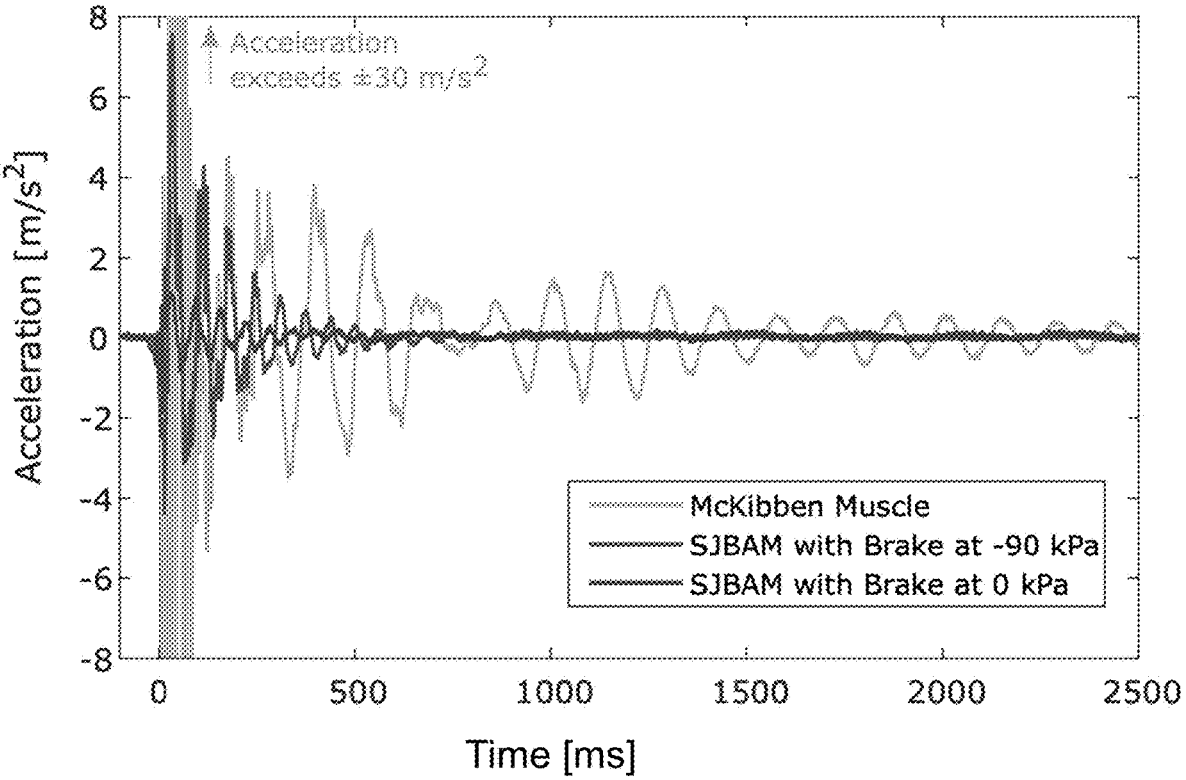
FIG. 8 shows according to an exemplary embodiment of the invention acceleration over time of free end cap following application of a dropped mass. Not only is peak acceleration amplitude much larger for the standalone McKibben muscle (reaching over 30 m/s²), but oscillations continue for several seconds after they have been suppressed in the SJBAM. For color interpretation of this grey scale diagram the reader is referred to the priority document.

FIG. 8 shows the response for the equivalent McKibben muscle. The relatively low stiffness of the McKibben muscle results in a high peak acceleration due to the inability of the muscle to dissipate the kinetic energy, and its low damping results in continued oscillation for several seconds.

FIG. 8 also shows the response for the SJBAM with the brake activated. In both cases with the brake engaged, the brake dissipates the kinetic energy, resulting in lower peak acceleration than with the McKibben muscle. Afterwards, the friction damping clamps the muscle position, preventing further oscillation. The energy dissipated is a function of the displacement and brake pressure. The brake at 0 kPa dissipates more energy than that at –90 kPa due to its ability to travel further. Given a known disturbance to reject, the pressure of the brake can be preset to absorb the largest amount of energy.

To achieve similar small deflections, a traditional McKibben muscle would need to be highly pressurized to increase its spring constant. However, this results mainly in storage of the impact energy, potentially resulting in rebound, and greatly increases the corresponding loading forces on the support structure. The use of the brake mitigates both these effects.

Even with a high internal pressure, a McKibben muscle has comparatively low damping, as evidenced by the long McKibben settling time in FIG. 8. This is disadvantageous for applications that require maintenance of a desired position in the face of external disturbances without significant oscillation or precise positioning without overshoot.

The brake in the SJBAM acts as a friction damper, absorbing excess energy. The brake has a high stiffness below a certain force threshold, after which, its stiffness decreases dramatically. When the brake enters the latter region, it dissipates energy. This two-phase behavior is particularly advantageous for maintaining a desired position without excessively stressing the robot structure. By setting the pressure gradient across the brake, the force below which the SJBAM will minimally yield can be selected. However, upon encountering forces exceeding this threshold, the brake dissipates the excess energy. Thus, the SJBAM can be made very stiff but upon encountering dangerously high forces, will compliantly yield, dissipating excess energy and preventing structural damage.

Degree of Freedom Manipulator

One potential application of the SJBAM is in a 1 degree of freedom (DOF) manipulator for use in physical human-robot interaction. The inventors conducted a demonstration using a 1-DOF manipulator with antagonistic actuation to directly compare SJBAMs and traditional PAMs in a sample application.

Setup Overview

Figure 9:
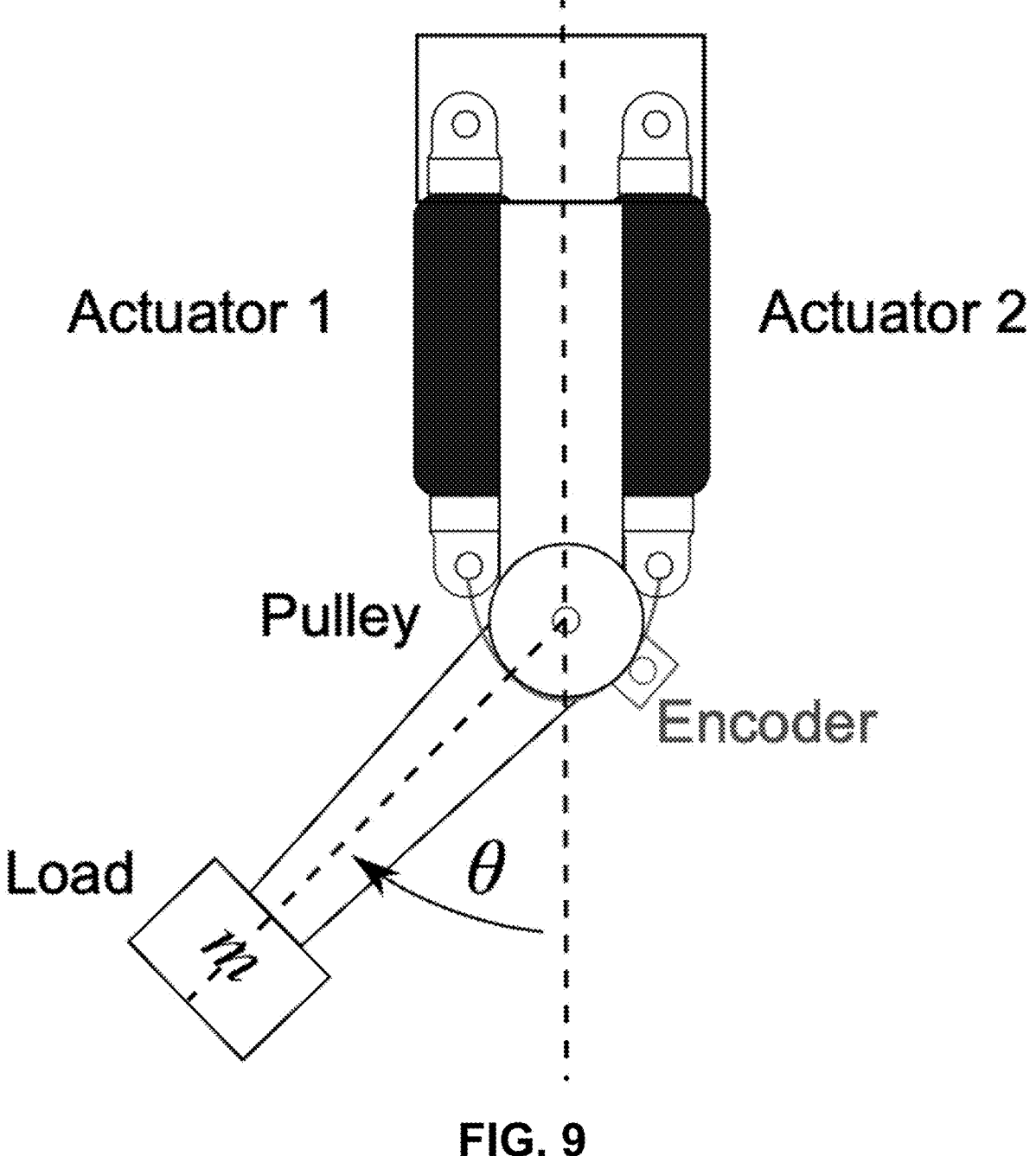
FIG. 9 show according to an exemplary embodiment of the invention 1-DOF manipulator setup. Top-down schematic of 1-DOF manipulator. The actuators used can be either McKibben muscles or SJBAMs.

FIG. 9 shows the 1-DOF manipulator used in our experiments. Two PAMs-McKibben muscles or SJBAMs—are arranged antagonistically to each other and the contractile force of each PAM is transmitted to the axis of rotation via a pulley. The angular displacement was recorded using a Bourns EMS22 rotary encoder. The 1-DOF manipulator was mounted parallel to the ground to avoid gravitational effects.

Figures 10A, 10B, 10C, 10D:
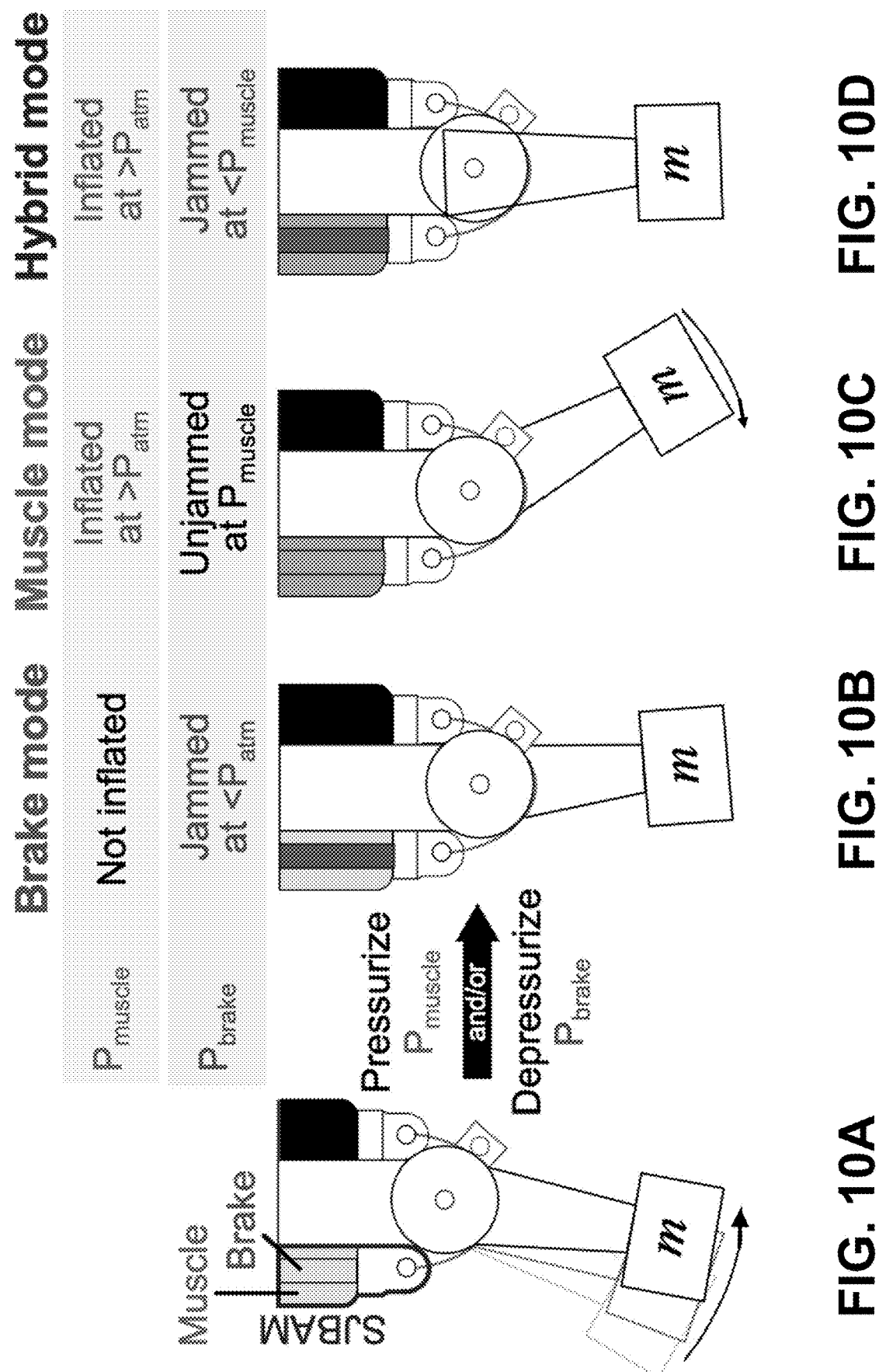
FIGS. 10A-D show according to an exemplary embodiment of the invention the SJBAM, shown as the left actuator in each subfigure, can function in three primary modes.

FIGS. 10B-D illustrate three operating modes of the SJBAM: as a brake, a muscle, or a hybrid mode in which the muscle and brake are active simultaneously.

Depending on the intended task, the various SJBAM modes can be used for energy storage or its release. In the muscle mode, the SJBAM behaves like a McKibben muscle, enabling the storage and release of elastic energy like other passively compliant actuators. In the brake mode, the SJBAM can act as a friction-based clutch which locks the displacement of the SJBAM, and thus the 1-DOF manipulator, without consuming energy while clutching. In the hybrid mode, the SJBAM acts as a clutch with enhanced locking force but with a slower response time compared to the standalone brake mode due to the need to repressurize to a higher pressure.

The brake and hybrid modes can also be used for the dissipation of energy. During these modes, the jamming brake can passively dissipate energy. With the hybrid mode in particular, this can allow for tuning of the amount of energy to be stored in the muscle elastic membrane and the amount to be dissipated through the brake.

Dynamic Breaking

We demonstrated the SJBAM in a dynamic braking appli-cation using the 1-DOF manipulator setup. We compared the braking performance of the SJBAM and a McKibben muscle using the 1-DOF manipulator with a bang-bang controller. For the McKibben muscle, it was repressurized to 75 kPa to actively drive the end effector back to its starting position. For the SJBAM, after crossing the desired angular position, the brake pressure was set to vacuum.

The McKibben muscle took 264 ms to return to the desired position after initially crossing it, featured a maximum over-shoot of 11.4°, and the bang-bang control results in continued oscillation. The settling time of the SJBAM from first crossing the desired position was 257 ms with a maximum overshoot of 4.95° due to the compliance of the system, with the system settling at 0.6° from the desired position. Thus, the SJBAM is able to achieve quick, stable deceleration without using a complex control strategy.

What is claimed is:

1. A variable impedance actuator with independent control of stiffness and damping of the actuator, comprising:
   (a) a Mckibben actuator having a first end and a second end; and
   (b) a jamming brake located inside the Mckibben actuator and connected to the same first end and the same second end of the Mckibben actuator, and wherein, a positive pressure applied through activation of the Mckibben actuator is used for adjusting tuning and damping of the variable impedance actuator, and
   wherein the jamming brake has n layers of stacked material split into two sets of layers, where there is a length $L_1$ which is the length protruding from the first end, where there is a length $L_2$ which is the length protruding from the second end, and where there is an overlapping length $L_{overlap}$ which is the length corresponding to the overlapping region between the two sets of layers.

2. A variable impedance actuator with independent control of stiffness and damping of the actuator, comprising:
   (a) a bladder-style actuator having a first end and a second end; and
   (b) a jamming brake located inside the bladder-style actuator and connected to the first end and the second end of the bladder-style actuator, and wherein a positive pressure applied through activation of the bladder-style actuator is used for adjusting tuning and damping of the variable impedance actuator,
   wherein the jamming brake has n layers of stacked material split into two sets of layers, where there is a length $L_1$ which is the length protruding from the first end, where there is a length $L_2$ which is the length protruding from the second end, and where there is an overlapping length $L_{overlap}$ which is the length corresponding to the overlapping region between the two sets of layers.

* * * * *